United States Patent [19]

Karasawa et al.

[11] Patent Number: 5,631,332
[45] Date of Patent: May 20, 1997

[54] CURING AGENTS FOR EPOXY RESINS COMPRISING BIS(AMINOMETHYL) BICYCLO[2.2.1]HEPTANE ADDUCTS

[75] Inventors: Minato Karasawa; Takuji Shimizu, both of Mobara, Japan

[73] Assignee: Mitsui Toatsu Chemicals, Inc., Tokyo, Japan

[21] Appl. No.: 584,551

[22] Filed: Jan. 11, 1996

[30] Foreign Application Priority Data

Jan. 17, 1995 [JP] Japan ..................... 7-004940

[51] Int. Cl.$^6$ ..................... C08G 59/18; C08G 59/50
[52] U.S. Cl. ..................... 525/504; 525/526; 528/111; 528/122; 564/306
[58] Field of Search ..................... 528/122, 111; 525/526, 504; 564/306

[56] References Cited

U.S. PATENT DOCUMENTS

| | | | |
|---|---|---|---|
| 3,595,917 | 7/1971 | Trecker et al. | 260/563 |
| 3,629,181 | 12/1971 | Heer et al. | 528/122 |
| 5,087,722 | 2/1992 | Inomata et al. | 558/338 |

FOREIGN PATENT DOCUMENTS

| | | |
|---|---|---|
| 3202491 | 8/1983 | Germany . |
| 54-4992 | 1/1979 | Japan . |
| 3-81255 | 4/1991 | Japan . |
| 3-95151 | 4/1991 | Japan . |
| 3-109361 | 5/1991 | Japan . |
| 3-181446 | 8/1991 | Japan . |
| 3-232850 | 10/1991 | Japan . |
| 4-80228 | 3/1992 | Japan . |
| 4-224553 | 8/1992 | Japan . |
| 6-184082 | 7/1994 | Japan . |

OTHER PUBLICATIONS

Database WPI, Week 9217, Derwent Publications Ltd., London, GB; AN 92-138016 XP 002007039 & JP-A-04080228 (Mitsui Toatsu Chemicals, Inc.), Mar. 13, 1992 *Abstract*.

Database WPI, Week 7908, Derwent Publications Ltd., London, GB; AN 79-14693 XP002007040 & JP-A-54004992 (Japan Geon KK), Jan. 16, 1979 *Abstract*.

Database WPI, Week 9337, Derwent Publications Ltd., London, GB; AN 93-290563 XP002007041 & JP-A-05171127 (Mitsui Toatsu Chemicals, Inc.), Jul. 9, 1993 *Abstract*.

B. Ellis, Editor, "Chemistry and Technology of Epoxy Resins", 1993, Blackie Academic & Professional, London, GB XP002007038, pp. 42, 43 and 53.

*Primary Examiner*—Frederick Krass
*Attorney, Agent, or Firm*—Burns, Doane, Swecker & Mathis

[57] ABSTRACT

A curing agent for epoxy resins, prepared by reacting 2,5- and 2,6-bis(aminomethyl)-bicyclo[2.2.1]heptanes (1 equivalent of the active hydrogen in the amino group) with an epoxy resin (a reaction product of bisphenols or a novolak resin with epichlorohydrin; an epoxy equivalent of 150–300 g/eq.; two or more epoxy groups per molecule; bisphenol-A diglycidyl ether or bisphenol-F diglycidyl ether in particular)(0.025–0.50 equivalents of the epoxy group). The reaction temperature is 40°–120° C. The amount of the curing agent is within the range of 20–75 parts by weight relative to 100 parts by weight of an epoxy resin to be cured. The curing agent has a high curing rate at a room temperature, and the epoxy resins cured by it have a good appearance as well as excellent adhesion, water resistance, and chemical resistance. Therefore, the curing agent is suitable for paints, civil engineering and construction materials, adhesives, casting resins, laminates, etc.

9 Claims, No Drawings

CURING AGENTS FOR EPOXY RESINS COMPRISING BIS(AMINOMETHYL) BICYCLO[2.2.1]HEPTANE ADDUCTS

BACKGROUND OF THE INVENTION

1. Field of the Invention

The present invention relates to a novel curing agent for epoxy resins. More specifically, the present invention relates to a curing agent for epoxy resins, wherein the curing agent is prepared by reacting 2,5- and 2,6-bis(aminomethyl)-bicyclo[2.2.1]heptanes(norbornanediamine; hereinafter abbreviated as NBDA) with an epoxy resin.

2. Description of the Related Art

Aliphatic polyamines have widely been used as a curing agent for epoxy resins because of their capability of curing epoxy resins rapidly even at a room temperature, as well as their ease in handling due to being in a liquid state in most cases. However, aliphatic polyamines themselves generally have an unpleasant odor and cause skin irritation, and a cured product formed as a result of reaction between an aliphatic polyamine with an epoxy resin absorbs carbon dioxide in the air to cause the phenomenon of whitening or so-called amine blushing.

In addition, compared with the aliphatic polyamines, alicyclic polyamines are known to have such advantages as low vapor pressure and weak skin irritation. This, however, does not thoroughly compensate for the above-mentioned drawbacks of the aliphatic polyamines. For example, NBDA, one of the alicyclic polyamines, is disclosed in German Patent No. 3,202,491. According to this patent, unmodified NBDA rapidly cures bisphenol diglycidyl ether epoxy resins at a low temperature (50° C. or lower) and the resultant cured products exhibit good acid resistance. However, when used as a curing agent without modification, NBDA has nearly the same drawbacks as those of aliphatic polyamines and cannot be used an a practical curing agent. While having low basicity and weak skin irritation, aromatic polyamines are low in a curing rate and are difficult in handling due to being in solid state in many cases.

In this respect, modified amine curing agents are widely used, where in general, an epoxy resin is made addition to an aliphatic polyamine. However, the conventional modified amine curing agents for epoxy resins have drawbacks such as the resultant cured products have insufficient water resistance and, in many cases, surface tackiness. Also investigated are curing agents which are prepared by adding epoxy resins to aromatic polyamines; however, they still have several drawbacks such as a low curing rate at a low temperature, low stability due to crystallization, yellowing at the surface of the resultant cured products, and low flexibility of the cured products.

Japanese Patent Application Laid-open Nos. SHO54-4992 and HEI 4-80228 disclose a modified monoepoxy compound as a curing agent for epoxy resins, wherein the modified monoepoxy compound is prepared by reacting NBDA with a monoepoxy compound such as ethylene oxide, propylene oxide, butyl glycidyl ether and the like.

In the former disclosure, the resultant modified monoepoxy compound is evaluated to have an effect of lengthening the pot life, i.e. to reduce the curing rate at a room temperature, and the epoxy resin films heat-cured by using the compound exhibit good impact resistance, flexibility, chemical resistance, etc. However, the modified monoepoxy compound provides a low curing rate at a room temperature, and the resultant cured products have insufficient properties as to gloss, water resistance, chemical resistance, etc. The reason for such drawbacks would be that, through the reaction of NBDA with a monoepoxy resin, most of the primary amino groups in NBDA change into the secondary ones to reduce the reactivity of the resultant modified product with epoxy resins and the crosslinking density of the cured products.

In the latter disclosure, the resultant modified monoepoxy compound is evaluated to have low viscosity and the epoxy resin films cured at a room temperature by using the compound exhibit excellent adhesion and water resistance. However, the modified monoepoxy compound provides a low curing rate at room temperature, and the resultant cured films have insufficient properties such as chemical resistance, etc.

SUMMARY OF THE INVENTION

An object of the present invention is to overcome the above-mentioned drawbacks of the conventional curing agents and to provide a curing agent for epoxy resins, wherein the curing agent has a high curing rate at room temperature, and the resultant cured products therefrom have excellent properties, particularly as to adhesion, water resistance, and chemical resistance, and do not yellow when exposed to sunlight.

The present inventors have made tremendous studies and have found that the reaction of NBDA with one or more bisphenol-A or bisphenol-F based epoxy resins at a certain ratio, forms a useful curing agent for epoxy resins. The present invention was thus completed.

As mentioned above, the present invention provides a curing agent for epoxy resins, characterized in that the curing agent is prepared by reacting NBDA with an epoxy resin. More specifically, the present invention provides a curing agent for epoxy resins, characterized in that the epoxy resin to be reacted with NBDA is prepared by reacting bisphenols with epichlorohydrin or a novolak resin with epichlorohydrin; the resultant epoxy resins have an epoxy equivalent of 150–300 g/eq. and two or more epoxy groups per molecule, and are bisphenol-A diglycidyl ether and/or bisphenol-F diglycidyl ether in particular; the equivalent of the epoxy group in the epoxy resin relative to one equivalent of the active hydrogen in the amino group of NBDA is 0.025–0.50; the reaction of NBDA with the epoxy resin is carried out at a temperature of 40°–120° C.; and the amount of the curing agent is within the range of 20–75 parts by weight relative to 100 parts by weight of the epoxy resin to be cured.

The curing agent according to the present invention provides a high curing rate, and the epoxy resins cured with this curing agent have a good appearance as well as excellent adhesion, water resistance, and chemical resistance. Therefore, the curing agent of the present invention may advantageously be used with epoxy resins for paints, civil engineering and construction materials, adhesives, casting resins, laminates, etc.

DETAILED DESCRIPTION OF THE PREFERRED EMBODIMENTS

NBDA, the primary raw material of the curing agent for epoxy resins of the present invention, may be prepared by known processes, including a process in which dicyclopentadiene is reacted with acrylonitrile to produce cyanonorbornene, which is then reacted with hydrogen cyanide to produce dicyanonorbornane, and finally the resultant dicyanonorbornane is hydrogenated (disclosed in Japanese Patent Application Laid-open Nos. HEI 3-81255, 3-95151, 3-109361, 3-181446, 3-232850, 4-224553, and 6-184082). NBDA prepared by the above-mentioned process is a mixture of 2,5- and 2,6-bis(aminomethyl) isomers in any proportion. Usually the proportion by weight is 10/90–90/10, in many cases 25/75–75/25.

An epoxy resin, another raw material of the curing agent for epoxy resins of the present invention, may be one which is prepared by reacting epichlorohydrin with bisphenol such as bisphenol-A, bisphenol-F, etc. or epichlorohydrin with a novolak resin produced by the addition condensation of phenol or cresol, and formaldehyde; have an epoxy equivalent of 150–600 g/eq.; have two or more epoxy groups per molecule; and be in a liquid or semisolid state. The epoxy resins so prepared may be used by themselves or as a mixture thereof. Of those epoxy resins, preferred is bisphenol-A diglycidyl ether or bisphenol-F diglycidyl ether, which may be prepared by reacting epichlorohydrin with bisphenol-A or bisphenol-F, have an epoxy equivalent of 150–300 g/eq., and be in a liquid state. On the contrary, the object of the present invention cannot be achieved with monoepoxy compounds which do not belong to the above-mentioned epoxy resin, e.g., alkylene monoxides, alkyl monoglycidyl ethers, alkyl monoglycidyl esters, etc.

Examples of the above-mentioned epoxy resin include bisphenol-A resins such as Epikote 825, Epikote 827, and Epikote 828 by YUKA SHELL EPOXY KABUSHIKI KAISYA, Epiclon 840 and Epiclon 850 by DAINIPPON INK AND CHEMICALS, INC., and ACR Epoxy R-82 by A.C.R. COMPANY LIMITED; bisphenol-F resins such as Epikote 806 and Epikote 807 by YUKA SHELL EPOXY KABUSHIKI KAISYA, Epiclon 830 and Epiclon 835 by DAINIPPON INK AND CHEMICALS, INC., and ACR Epoxy R-97 by A.C.R. COMPANY LIMITED; and phenol novolak resins such as Epikote 152 and Epikote 154 by YUKA SHELL EPOXY KABUSHIKI KAISYA.

The ratio of NBDA to the epoxy resin in the reaction may be adjusted so that the resultant product has active hydrogens in the amino groups. Typically, the amount of the epoxy group in the epoxy resin is 0.025–0.5 equivalents, preferably 0.05–0.25 equivalents, relative to one equivalent of the active hydrogen in the amino group of NBDA. The resultant curing agent tends to have a strong smell of amines when the above-mentioned amount is below 0.025 equivalents, while it tends to produce a cured epoxy resin and cannot suitably be used as a curing agent as such when the amount is above 0.5 equivalents; therefore, both of the cases are not preferred.

The curing agent for epoxy resins of the present invention may be prepared by reacting NBDA and the epoxy resin after charging them together. However, the reaction tends to proceed rapidly due to the generated heat of reaction and, in many cases, results in the formation of a cured product. Therefore, it is preferred to carry out the reaction while adding the epoxy resin to NBDA.

In the above-mentioned reaction, the temperature is typically 40°–120° C., preferably 60°–90° C. The reaction proceeds slowly when the temperature is below 40° C., while it proceeds rapidly and tends to form a cured product when the temperature is above 120° C.; therefore, both of the cases are not preferred. The reaction time should be adjusted so that the reaction is completed. It varies depending on the type of the epoxy resin, the ratio of NBDA to the epoxy resin, the reaction temperature, etc. Typically, it is within the range of 1–5 hours.

The curing agent for epoxy resins of the present invention prepared by the above-mentioned reaction may be used with curing accelerators, e.g., phenols, tertiary amines, etc., and additives, e.g., pigments, fillers, extenders, reinforcing agents, solvents, etc.

Specific examples of the preferable solvents include aromatic compounds such as toluene and xylene; aliphatic alcohols having 1–4 carbon atoms such as methyl alcohol, ethyl alcohol, n-propyl alcohol, isopropyl alcohol, n-butyl alcohol, and isobutyl alcohol; ketones such as acetone and methyl ethyl ketone; and mixtures thereof. Particularly, xylene and n-butyl alcohol are preferable.

When the above-mentioned solvent is added to the curing agent for epoxy resins of the present invention, the amount of the curing agent is 60% by weight or more, preferably 80% by weight or more, based on the total weight of the curing agent and the solvent. The curing rate of the epoxy resin at a room temperature and the water resistance, chemical resistance, etc. of the resultant cured product decrease greatly when the above-mentioned amount is below 60% by weight; in this case, the curing agent can not function sufficiently.

The epoxy resin to be cured with the curing agent prepared by the above-mentioned reaction may be any epoxy resins having glycidyl groups and capable of reacting with active hydrogens. Examples of the epoxy resins include bisphenol-A epoxy resins, bisphenol-F epoxy resins, bisphenol-AD epoxy resins, urethane-modified epoxy resins containing urethane bonds, novolak epoxy resins, glycidyl ester epoxy resins, glycidyl amine epoxy resins, and alicyclic epoxy resins; however, the present invention is not limited thereto. Those resins may be used by themselves or as a mixture thereof.

When the curing agent of the present invention is used without any solvent to cure the above-mentioned epoxy resins, the amount of the curing agent is typically 10–200 parts by weight, preferably 20–75 parts by weight, relative to 100 parts by weight of the epoxy resin. When the above-mentioned amount is below 10 parts by weight, the epoxy resin is not cured sufficiently and the water resistance, etc. of the cured products tend to deteriorate; on the other hand, when the amount is above 200 parts by weight, the curing rate is high, but the water resistance of the cured products greatly deteriorates because a large amount of the active hydrogens in the amino groups remain unreacted. Therefore, both of the cases are not preferred. In addition, when the curing agent of the present invention is used with a solvent mixed, the amount of the curing agent free from the solvent relative to the epoxy resin, may also be within the above-mentioned range.

The curing agent of the present invention may be mixed with an epoxy resin either directly or in the presence of a solvent. The cure may be carried out either at a room temperature or with heating. The curing agent of the present invention is excellent in curing rate at a room temperature and properties of the cured products. Furthermore, these excellent properties are also observed when the cure is carried out with heating; therefore, the curing agent of the present invention may be used in various applications where heating is required.

The curing agent of the present invention may be used with other known curing agents such as aliphatic polyamines, aromatic polyamines, alicyclic polyamines, polyamide amines, and modified polyamines prepared by reacting those polyamines with epoxy compounds. In this case, the object of the present invention can be achieved by adjusting the amount of the curing agent of the present invention to 20% by weight or more based on the total weight of the curing agents.

The curing agent of the present invention is weak in skin irritation, and the epoxy resins cured by using it have excellent adhesion, water resistance, and chemical resistance and are characterized in that they hardly yellow compared with conventional ones.

EXAMPLES

The present invention will be described in detail by reference to the following synthesis examples, examples, and comparative examples.

Hereinafter, all parts, percents, and ppms are by weight. In the synthesis examples, the reaction solutions obtained were analyzed by gas chromatography.

Synthesis Example 1 (Preparation of Cyanonorbornene)

Raw materials (54.2% of dicyclopentadiene and 45.8% of acrylonitrile) and a polymerization inhibitor (500 ppm of hydroquinone) were mixed, and the mixture was continuously charged at a rate of 50 ml/hr. to a tubular reactor (the inner diameter of 8 mm). The temperature was adjusted to 153° C. for 5 hours of the initial charging time, 170° C. for 2 hours of the next charging time, and 180° C. for 2 hours of the next charging time. After steady state was reached, the reaction was further carried out for 20 hours to obtain 1 liter of crude cyanonorbornene of a purity of 95%. The resultant crude cyanonorbornene was then concentrated under reduced pressure and the unreacted reactants, i.e., dicyclopentadiene and acrylonitrile, were distilled off to obtain 950 g of cyanonorbornene of a purity of 99.6%.

Synthesis Example 2 (Preparation of Dicyanonorbornane)

A 300-mL round bottom glass flask fitted with a stirrer, a thermometer, a nitrogen inlet, a heater, and a condenser was charged with catalysts (2.48 g of tetrakis(triphenyl phosphite) nickel, 0.27 g of zinc chloride, and 2.48 g of triphenyl phosphite) and 249 g of cyanonorbornene obtained as described in Synthesis Example 1. The gas phase portion in the flask was then replaced by nitrogen and the catalysts were dissolved with stirring at a temperature of 85° C.

Then, nitrogen gas was introduced to liquid hydrogen cyanide in a vessel cooled with iced water and hydrogen cyanide gas was generated by bubbling. The generated hydrogen cyanide gas (the total weight of 59 g) was added to the solution in the flask over a period of 5 hours and was reacted. The above-mentioned operation was repeated yet two more times, and the solutions obtained in the three operations were mixed together to obtain crude dicyanonorbornane of a purity of 97%.

Furthermore, nitrogen gas was added to the crude dicyanonorbornane for aeration at a rate of 500 ml/min. for 1 hour, and then the insolubles were filtered off. A 2 lit. round bottom glass flask fitted with a stirrer a thermometer, a nitrogen inlet, a heater, and a condenser was charged with 800 g of the resultant filtrate and 240 g of toluene. Then added was 160 g of 8% aqueous solution of sodium hydroxide, and the mixture was heated with stirring at 50° C. for 1 hour. The one half of the resultant solution (i.e., 600 g) was poured into a 2-L separatory funnel and 680 g of toluene was added to extract the dicyanonorbornane. The organic portion containing the extract was washed with 400 g of water. This operation was repeated three times. The other half of the resultant solution (i.e., 600 g) was also treated according to the above-mentioned procedure. Finally, a total amount of about 2,400 g of the toluene solution containing 33% of dicyanonorbornane was obtained.

Synthesis Example 3 (Preparation of NBDA)

A 3-L stainless steel autoclave fitted with a magnetic stirrer was charged with 2,000 g of the toluene solution containing 33% of dicyanonorbornane obtained in Synthesis Example 2 and 13.2 g of Raney cobalt catalyst, and then charged with 137 g of liquid ammonia. The autoclave was then pressurized to 70 kg/cm$^2$G with hydrogen, and catalytic hydrogenation was carried out with stirring at 150° C. After the reaction was completed, the catalysts were filtered off and NBDA was then separated from the toluene by vacuum distillation to obtain about 600 g of NBDA of a purity of 99.8%.

Example 1

A 4-neck flask fitted with an stirrer, a thermometer, a heater, and a condenser was charged with 154 g (4.0 eq) of NBDA obtained in Synthesis Example 3. To NBDA was added dropwise 38 g (0.2 eq) of Epikote 828 (a bisphenol-A epoxy resin by YUKA SHELL EPOXY KABUSHIKI KAISYA; an epoxy equivalent: 190 g/eq. ) with the temperature maintaining at 80° C. The reaction was carried out for 2 hours and then the product was cooled to the room temperature to obtain 192 g of the curing agent. The samples were taken from the flask and their infrared spectrums were measured to determine the end point of the reaction where no absorption band due to epoxy groups was observed.

Comparative Example 1

The NBDA obtained in Synthesis Example 3 was used as a curing agent without any modification.

Examples 2 and 4/Comparative Examples 2, 3, and 6

As shown in Tables 1 and 2, each curing agent was prepared in the same way as in Example 1 except that the type and/or the amount of the amine and/or the epoxy resin were changed: 230 g of curing agent for Example 2, 220 g of curing agent for Example 4, 246 g of curing agent for Comparative Example 2, and 212 g of curing agent for Comparative Example 3. Epikote 807 (a bisphenol-F epoxy resin by YUKA SHELL EPOXY KABUSHIKI KAISYA; an epoxy equivalent: 167 g/eq.) was used for Example 4, isophorone diamine (sold by HOLS JAPAN LTD as VESTAMIN IPD) for Comparative Example 2, and meta-xylylene diamine (sold by MITSUBISI GAS CHEMICAL COMPANY, INC. as MXDA) for Comparative Example 3.

But in Comparative Example 6, the resultant product was a cured epoxy resin and could not be used as a curing agent.

Example 3

Example 2 was repeated in the same way except that the mixture of the curing agent and xylene with a weight ratio of the curing agent to the xylene adjusted to 8/2 was used as a curing agent.

Comparative Example 4

A 4-neck flask fitted with a stirrer, a thermometer, a heater, and a condenser was charged with 154 g (4.0 eq) of NBDA obtained in Synthesis Example 3. To NBDA was added 1.0 g (0.025 moles) of sodium hydroxide. The solution was heated up to 100° C. with stirring and 88 g (2.0 eq) of ethylene oxide was then injected into the solution over a period of 3 hours. After that, the unreacted ethylene oxide was distilled off by vacuum distillation to obtain 240 g of the curing agent.

Comparative Example 5

A 4-neck flask fitted with a stirrer, a thermometer, a heater, and a condenser was charged with 154 g (4.0 eq) of NBDA obtained in Synthesis Example 3. With the temperature maintaining at 60° C., 156 g (1.2 eq) of butyl glycidyl ether was added dropwise and reacted for 2 hours to obtain 310 g of the curing agent.

TABLE 1

|  |  | Examples | | | |
|---|---|---|---|---|---|
|  |  | 1 | 2 | 3 | 4 |
| Diamine: | | | | | |
| NBDA | parts | 154 | 154 | 154 | 154 |
|  | equivalents | 4.0 | 4.0 | 4.0 | 4.0 |
| Epoxy Resins: | | | | | |
| Epikote 828 | parts | 38 | 76 | 76 | — |
|  | equivalents | 0.2 | 0.4 | 0.4 | — |
| Epikote 807 | parts | — | — | — | 66 |
|  | equivalents | — | — | — | 0.4 |
| Solvent: | | | | | |
| Xylene | parts | — | — | 58 | — |

TABLE 2

|  |  | Comparative Examples | | | | | |
|---|---|---|---|---|---|---|---|
|  |  | 1 | 2 | 3 | 4 | 5 | 6 |
| Diamines: | | | | | | | |
| NBDA | parts | 154 | — | — | 154 | 154 | 154 |
|  | equivalents | 4.0 | — | — | 4.0 | 4.0 | 4.0 |
| Isophorone | parts | — | 170 | — | — | — | — |
| Diamine | equivalents | — | 4.0 | — | — | — | — |
| Meta-xylylene | parts | — | — | 136 | — | — | — |
| Diamine | equivalents | — | — | 4.0 | — | — | — |
| Epoxy Resin or Monoepoxy Compounds: | | | | | | | |
| Epikote 828 | parts | — | 76 | 76 | — | — | 570 |
|  | equivalents | — | 0.4 | 0.4 | — | — | 3.0 |
| Ethylene Oxide | parts | — | — | — | 88 | — | — |
|  | equivalents | — | — | — | 2.0 | — | — |
| Butyl Glycidyl | parts | — | — | — | — | 156 | — |
| Ether | equivalents | — | — | — | — | 1.2 | — |

Epikote 828 (a bisphenol-A epoxy resin by YUKA SHELL EPOXY KABUSHIKI KAISYA; an epoxy equivalent 190: g/eq.) was used as the epoxy resin to be cured by the 9 curing agents obtained in Examples 1–4 and Comparative Examples 1–5. The following tests were conducted to evaluate the curing agents for epoxy resins. The results are summarized in Tables 3 and 4.

(1) Curing Rate

The epoxy resin was mixed with the curing agent at a constant temperature of 25° C. in the ratio shown in Tables 3 and 4, and then 50 g of the mixture (50 g) was transferred to a vessel. The vessel was fitted with a thermocouple thermometer and stoppered, and the time required to reach the maximum temperature was measured. The time is estimated to be an index to the curing time. The epoxy resin was mixed with the curing agent in such a manner that the ratio of the epoxy groups in the epoxy resin to the active hydrogens in the amino groups of the curing agent was 1/1 (equivalent ratio).

(2) Film Properties

The epoxy resin was mixed with the curing agent in the ratio shown in Tables 3 and 4, and then the mixture was degassed under the pressure of 20 Torr for 3 min. The mixture was coated in a thickness of 200 µm on a cold-rolled steel sheet (150 mm×70 mm×0.8 mm thickness) or a glass sheet (150 mm×70 mm×2.0 mm thickness). The coated film was then cured at a temperature of 20°–25° C. for 7 days to provide a specimen.

Drying Time

In accordance with JIS-K-5400, from immediately after the coated film was formed, measured was the time (hrs.) required to reach a state where a dent was not formed and the movement of the coated film was undetectable when the specimen (steel sheet) was strongly pinched with a thumb and an index finger, and a scrape was unobservable when the center of the specimen was rubbed repeatedly with a fingertip.

Appearance

The surface of the coated film of the specimen (steel sheet) was visually observed and evaluated in four levels as follows.

⊚: very glossy, ○: glossy, △: slightly whitened, ×: whitened

Pencil Hardness

In accordance with JIS-K-5400.6.14 pencil-scratch test, a pencil lead was applied to the specimen (steel sheet) at an angle of 45°, and the specimen was scratched with a load of 1 kg applied to the pencil lead. Pencils with different hardness were used in the ascending order of pencil hardness. The above-mentioned operation was repeated 5 times for each pencil and found the pencil hardness with which a break in the coated film was observed 2 times or more. The pencil hardness just before said pencil hardness was recorded.

Adhesion

In accordance with the JIS-K-5400.6.15 cross cut test, 11 parallel vertical lines and 11 parallel horizontal lines were drawn at 1 mm intervals on the coated film of the specimen (steel sheet) by using a cutter and a cutter guide so that lattice pattern cuts having 100 squares per $cm^2$ were made. After sticking strongly a cellophane tape by NICHIBAN CO., LTD on the coated film so treated and then stripping it, the number of the squares where the coated film remained was counted.

Flexibility

Using a Erichsen tester, a steel hemisphere was pressed against the back of the specimen (steel sheet), i.e., the side where the resin was not coated, and the distance (mm) that the hemisphere traveled to break the coated film was measured.

Impact Resistance

An impact test was conducted by using an impact tester in accordance with JIS-K-5400.6.13.3B. A specimen (steel sheet) was placed between a striking head with a round tip of 6.35±0.03 mm radius and a plate with a dent fitting the round tip. A weight of 500 g was then dropped on the specimen from a height and the height (cm) was measured when the coated film of the specimen was broken. The height just before said height, i.e. the maximum height before the coated film was not yet broken, was recorded as impact resistance.

Water Resistance

The specimen (glass sheet) was dipped in water at a room temperature for 7 days and the change in appearance of the coated film was visually observed; thereby the specimen was evaluated in four levels as follows.

⊚: very glossy, ○: glossy, Δ: slightly whitened, ×: whitened

Chemical Resistance

In aqueous solutions and organic solvents as shown in Tables 3 and 4, dipped was the specimen (glass sheet) at a room temperature for 7 days and the change in appearance of the specimen was visually observed; thereby the specimen was evaluated in four levels as follows.

⊚: very glossy, ○: glossy, Δ: slightly whitened, ×: whitened

TABLE 3

| | Examples | | | |
|---|---|---|---|---|
| | 1 | 2 | 3 | 4 |
| Epikote 828 (parts) | 100 | 100 | 100 | 100 |
| Curing Agents (parts) | 27 | 34 | 42 | 32 |
| Curing rate (min.) | 29 | 24 | 28 | 28 |
| Cured Films: | | | | |
| Drying Time (hrs.) | 4 | 3.5 | 4 | 5 |
| Appearance | ⊚ | ⊚ | ⊚ | ⊚ |
| Pencil Hardness | 2H | 2H | 2H | H |
| Adhesion | 100/100 | 100/100 | 100/100 | 100/100 |
| Flexibility (mm) | 0.2 | 0.3 | 0.2 | 0.6 |
| Impact Resistance (cm) | 20 | 20 | 20 | 25 |
| Water Resistance | ⊚ | ⊚ | ⊚ | ⊚ |
| Chemical Resistance | | | | |
| 10% Aqueous Solution of Sodium Hydroxide | ⊚ | ⊚ | ⊚ | ⊚ |
| 10% Aqueous Solution of Sulfuric Acid | ⊚ | ⊚ | ⊚ | ⊚ |
| 5% Aqueous Solution of Sodium Chloride | ○ | ⊚ | ⊚ | ⊚ |
| Methanol | ⊚ | ⊚ | ⊚ | ⊚ |
| Hexane | ⊚ | ⊚ | ⊚ | ⊚ |
| Toluene | ⊚ | ⊚ | ⊚ | ⊚ |

TABLE 4

| | Comparative Examples | | | | |
|---|---|---|---|---|---|
| | 1 | 2 | 3 | 4 | 5 |
| Epikote 828 (parts) | 100 | 100 | 100 | 100 | 100 |
| Curing Agents (parts) | 20 | 36 | 31 | 64 | 58 |
| Curing rate (min.) | 35 | 55 | 43 | 112 | 64 |
| Cured Films: | | | | | |
| Drying Time (hrs.) | * | 7 | 6 | 12 | 8 |
| Appearance | Δ | ⊚ | Δ | Δ | ○ |
| Pencil Hardness | * | F | F | HB | F |
| Adhesion | 80/100 | 50/100 | 80/100 | 46/100 | 84/100 |
| Flexibility (mm) | 0.2 | 0.2 | 0.2 | 0.1 | 0.2 |
| Impact Resistance (cm) | 5 | below 5 | below 5 | 5 | 10 |
| Water Resistance | × | ⊚ | × | × | ○ |

TABLE 4-continued

| | Comparative Examples | | | | |
|---|---|---|---|---|---|
| | 1 | 2 | 3 | 4 | 5 |
| Chemical Resistance | | | | | |
| 10% Aqueous Solution of Sodium Hydroxide | Δ | ⊚ | Δ | Δ | ○ |
| 10% Aqueous Solution of Sulfuric Acid | × | Δ | × | × | Δ |
| 5% Aqueous Solution of Sodium Chloride | × | Δ | × | × | ○ |
| Methanol | Δ | ○ | Δ | Δ | ○ |
| Hexane | Δ | ○ | Δ | Δ | ○ |
| Toluene | Δ | ○ | Δ | Δ | ○ |

*:Unmeasurable

What is claimed is:

1. A curing agent for epoxy resins prepared by reacting 2,5- and 2,6-bis(aminomethyl)-bicyclo[2.2.1]heptanes with an epoxy resin wherein the equivalent of the epoxy group in the epoxy resin relative to one equivalent of the active hydrogen in the amino group of the 2,5 and 2,6-bis (aminomethyl)-bicyclo[2.2.1]heptanes is 0.025–0.50 and said epoxy resin is a polyglycidyl ether of a polyphenol having an epoxy equivalent of 150–600 g/eq.

2. The curing agent of claim 1, wherein said epoxy resin is prepared by reacting bisphenols with epichlorohydrin or a novolak resin with epichlorohydrin.

3. The curing agent of claim 1, wherein said epoxy resin is bisphenol-A diglycidyl ether and/or bisphenol-F diglycidyl ether.

4. The curing agent of claim 1, wherein said epoxy resin has an epoxy equivalent of 150–300 g/eq. and two or more epoxy groups per molecule.

5. The curing agent of claim 1, wherein the equivalent of the epoxy group in said epoxy resin relative to one equivalent of the active hydrogen in the amino group of 2,5- and 2,6-bis(aminomethyl)-bicyclo[2.2.1]heptanes is 0.025–0.50 and said epoxy resin is bisphenol-A diglycidyl ether.

6. The curing agent of claim 1, wherein the equivalent of the epoxy group in said epoxy resin relative to one equivalent of the active hydrogen in the amino group of 2,5- and 2,6-bis(aminomethyl)-bicyclo[2.2.1]heptanes is 0.05–0.25.

7. The curing agent of claim 5, wherein the reaction of 2,5-and 2,6-bis(aminomethyl)-bicyclo[2.2.1]heptanes with said epoxy resin is carried out at a temperature of 40°–120° C.

8. The curing agent of claim 6, wherein the reaction of 2,5- and 2,6-bis(aminomethyl)-bicyclo[2.2.1]heptanes with said epoxy resin is carried out at a temperature of 40°–120° C.

9. A composition comprising the curing agent of claim 1, and a curable epoxy resin, wherein the amount of the curing agent is within the range of 20–75 parts by weight relative to 100 parts by weight of an epoxy resin to be cured.

* * * * *